US011339600B2

(12) United States Patent
Himmelein et al.

(10) Patent No.: US 11,339,600 B2
(45) Date of Patent: May 24, 2022

(54) DOOR HINGE SYSTEM FOR A PIVOTING DOOR OF A DOMESTIC APPLIANCE (71) Applicant: ELECTROLUX APPLIANCES AKTIEBOLAG, Stockholm (SE)

(72) Inventors: Benjamin Himmelein, Rothenburg ob der Tauber (DE); Mario Weber, Rothenburg ob der Tauber (DE); David Joao Machado Martins, Rothenburg ob der Tauber (DE)

(73) Assignee: Electrolux Appliances Aktiebolag, Stockholm (SE)

( * ) Notice: Subject to any disclaimer, the term of this patent is extended or adjusted under 35 U.S.C. 154(b) by 0 days.

(21) Appl. No.: 16/626,696

(22) PCT Filed: Jul. 6, 2018

(86) PCT No.: PCT/EP2018/068340
§ 371 (c)(1),
(2) Date: Dec. 26, 2019

(87) PCT Pub. No.: WO2019/015994
PCT Pub. Date: Jan. 24, 2019

(65) Prior Publication Data
US 2020/0141173 A1 May 7, 2020

(30) Foreign Application Priority Data
Jul. 19, 2017 (EP) .................................. 17182005

(51) Int. Cl.
*E05F 15/614* (2015.01)
*E05F 15/40* (2015.01)
(Continued)

(52) U.S. Cl.
CPC ............ *E05F 15/614* (2015.01); *E05D 3/122* (2013.01); *E05D 11/1014* (2013.01);
(Continued)

(58) Field of Classification Search
CPC ......... E05F 15/40; E05F 15/41; E05F 15/614; E05F 1/1261; E05D 3/122; E05D 11/1014; E05D 11/1064; F16H 19/08; F24C 15/02
(Continued)

(56) References Cited

U.S. PATENT DOCUMENTS

| 3,123,064 A | 3/1964 | Hartson |
| 5,937,481 A | 8/1999 | Faringosi |

(Continued)

FOREIGN PATENT DOCUMENTS

| EP | 1961901 A2 | 8/2008 |
| EP | 2784257 A1 | 10/2014 |

(Continued)

OTHER PUBLICATIONS

International Search Report and Written Opinion in PCT/EP2018/068340 dated Aug. 13, 2018, 10 pages.

*Primary Examiner* — James O Hansen
(74) *Attorney, Agent, or Firm* — Pearne & Gordon LLP (57) ABSTRACT The present invention relates to a door hinge system (10) for a pivoting door (30) of a domestic appliance (20), in particular for a pivoting oven door (30) of a cooking oven (20). The door hinge system (10) comprises a stationary hinge part (12) in arranged or arrangeable at or in a chassis of the domestic appliance (20). The door hinge system (10) comprises a pivoting hinge part (14) connected or connectable to the door (30). The door hinge system (10) comprises a driving device (16, 18, 22, 24) for driving the pivoting hinge part (14). The driving device includes at least one motor (16) coupleable to and decoupleable from the pivoting hinge part (14). The driving device (16, 18, 22, 24) is
(Continued)

automatically controllable. The pivoting hinge part (14) is manually pivotable, if the motor (16) is decoupled from the pivoting hinge part (14).

17 Claims, 5 Drawing Sheets (51) Int. Cl.
*E05F 15/41* (2015.01)
*E05D 3/12* (2006.01)
*E05D 11/10* (2006.01)
*E05F 1/12* (2006.01)
*F16H 19/08* (2006.01)
*F24C 15/02* (2006.01)

(52) U.S. Cl.
CPC ........ *E05D 11/1064* (2013.01); *E05F 1/1261* (2013.01); *E05F 15/40* (2015.01); *E05F 15/41* (2015.01); *F16H 19/08* (2013.01); *F24C 15/02* (2013.01); *E05Y 2201/434* (2013.01); *E05Y 2400/40* (2013.01); *E05Y 2400/52* (2013.01); *E05Y 2400/66* (2013.01); *E05Y 2800/12* (2013.01); *E05Y 2900/30* (2013.01); *E05Y 2900/308* (2013.01)

(58) Field of Classification Search
USPC .......................... 126/190, 192; 312/409, 311
See application file for complete search history.

(56) References Cited

U.S. PATENT DOCUMENTS

| | | | | |
|---|---|---|---|---|
| 6,113,734 | A | * | 9/2000 | Woo ..................... F27D 1/1858 |
| | | | | 156/345.1 |
| 7,755,004 | B2 | * | 7/2010 | Collene ................. F24C 15/023 |
| | | | | 219/391 |
| 2004/0255929 | A1 | * | 12/2004 | Miller .................... F24B 1/192 |
| | | | | 126/500 |
| 2017/0089116 | A1 | | 3/2017 | Heiberger et al. |

FOREIGN PATENT DOCUMENTS

| | | |
|---|---|---|
| GB | 2350863 A | 12/2000 |
| WO | 2014111827 A1 | 7/2014 |

\* cited by examiner

DOOR HINGE SYSTEM FOR A PIVOTING DOOR OF A DOMESTIC APPLIANCE

The present invention relates to a door hinge system for a pivoting door of a domestic appliance. In particular, the present invention relates to door hinge system for a pivoting oven door of a cooking oven. Further, the present invention relates to a domestic appliance, in particular to a cooking oven.

The door of a domestic appliance, in particular the oven door for a cooking oven, are usually opened and closed manually by the user. This requires the presence of the user, when the door has to be opened or closed, respectively. Further, the opening and closing of the door requires mechanical forces provided by the user.

It is an object of the present invention to provide a door hinge system for a door of a domestic appliance, which allows a comfortable automatic and manual opening and closing of the door.

According to the present invention a door hinge system for a pivoting door of a domestic appliance, in particular for a pivoting oven door of a cooking oven, is provided wherein:
the door hinge system comprises a stationary hinge part arranged or arrangeable at or in a chassis of the domestic appliance,
the door hinge system comprises a pivoting hinge part connected or connectable to the door,
the door hinge system comprises a driving device for driving the pivoting hinge part,
the driving device includes at least one motor coupleable to and decoupleable from the pivoting hinge part,
the driving device is automatically controllable, and
the pivoting hinge part is manually pivotable, if the motor is decoupled from the pivoting hinge part.

The main idea of the present invention is that the driving device is automatically controllable on the one hand and the motor can be decoupled from the pivoting hinge part on the other hand. The user can decide if the door is automatically or manually opened and closed.

Preferably, the driving device includes a gearing interconnected between the motor and the pivoting hinge part.

In particular, the gearing includes a gear wheel forming an end stage of said gearing.

Further, the driving device may include a gear wheel sector connected or connectable to the pivoting hinge part, wherein teeth of said gear wheel sector engage with teeth of the gear wheel of the gearing.

Moreover, the door hinge system may comprise at least one coupling system, wherein said coupling system is interconnected between the motor and the gearing, the coupling system may be an internal part of the gearing, the coupling system is formed between the gear wheel and the gear wheel sector and/or the coupling system is formed between the gear wheel sector and the pivoting hinge part.

Preferably, the rotation axis of the motor extends parallel to the pivoting axis of the pivoting axis of the pivoting hinge part. This reduces the complexity of the driving device and the door hinge system.

Additionally, the motor is stoppable, if pivoting of the pivoting hinge part is blocked, wherein the pivoting hinge part is pivoted back in the opposite direction for a predefined distance or angle after stopping the motor.

In particular, the blocking of pivoting of the pivoting hinge part is detected or detectable, if more voltage or power for the motor is required.

Alternatively or additionally, the blocking of pivoting of the pivoting hinge part is detected or detectable by a sensor.

Further, the driving device may be controlled or controllable by a remote control. For example, the driving device is controlled by a smart phone or the like.

Moreover, the door hinge system comprises at least one spring element for generating at least one force acting onto the pivoting hinge part, wherein preferably said force supports a manual opening and closing of the door.

For example, the door hinge system comprises at least one first spring element mediating a partially opened state of the door and keeping said door balanced within an outer opening angular range, wherein the outer opening angular range extends between the partially opened state and a completely opened state of the door.

Further, the door hinge system may comprise at least one second spring element generating a closing force for the door, so that the door is kept closed.

In particular, the second spring element generates a closing force for the door, so that the door is pushed or pushable against a sealing. In the case of the cooking oven, the door aligned at the sealing avoids that condensate and/or steam escape from an oven cavity outward. For example, the closing force for the door is important in a steam cooking oven, wherein the closing force of the second spring element is bigger than the pressure inside the oven cavity. Moreover, the bigger the closing force of the second spring element, the bigger is the force for opening the door.

Further, the present invention relates to a domestic appliance with a pivoting door, in particular a cooking oven with a pivoting oven door, wherein the domestic appliance comprises at least one door hinge system mentioned above.

Novel and inventive features of the present invention are set forth in the appended claims.

The present invention will be described in further detail with reference to the drawing, in which.

Figure 1:
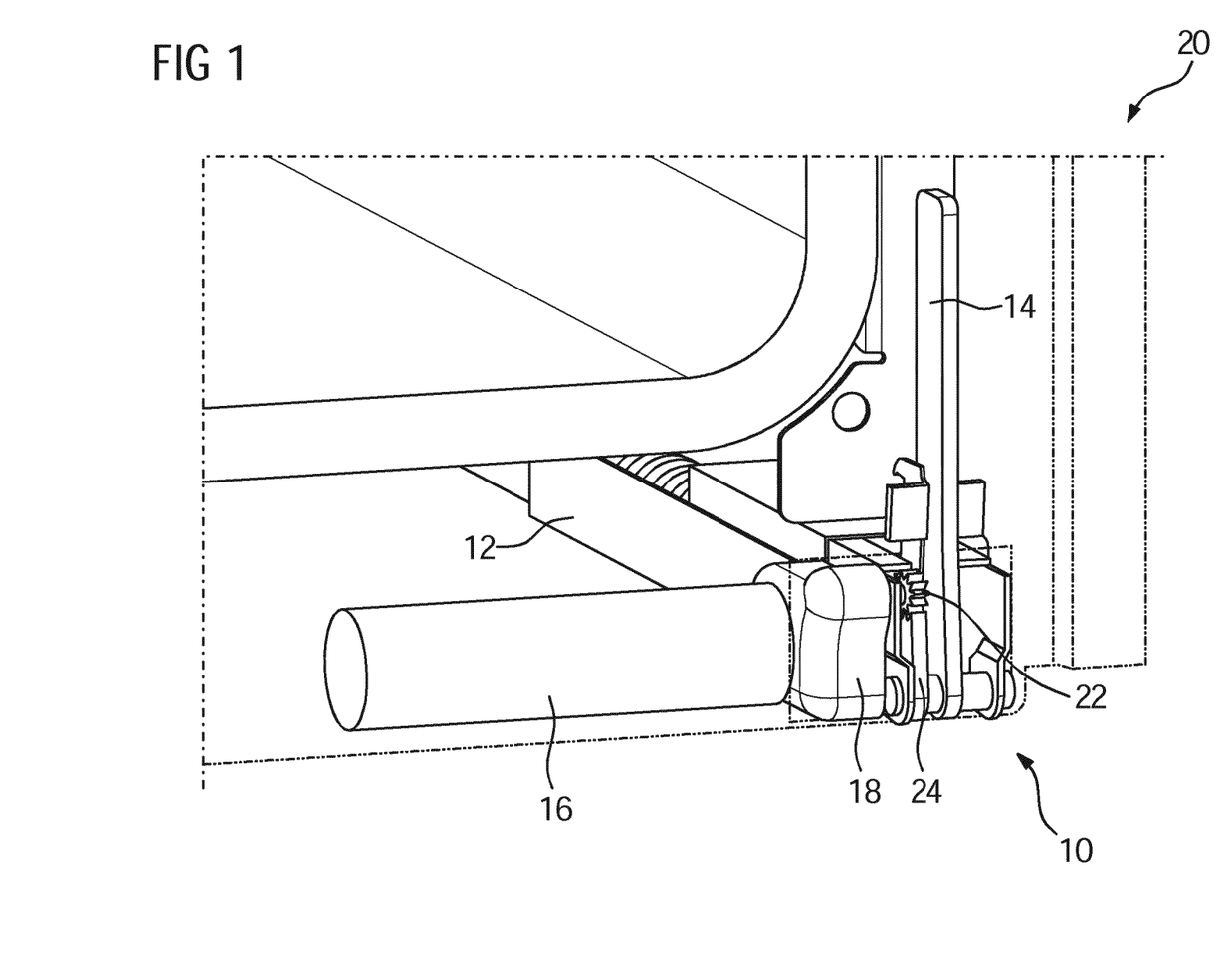
FIG. 1 illustrates a schematic perspective front view of a door hinge system for an oven door of a cooking oven according to a preferred embodiment of the present invention.

FIG. 1 illustrates a schematic perspective front view of a door hinge system 10 for an oven door 30 of a cooking oven 20 according to a preferred embodiment of the present invention. The door hinge system 10 is arranged in the cooking oven 20, while the oven door 30 is not shown in FIG. 1. In general, the door hinge system 10 according to the present invention may be provided for an arbitrary domestic appliance. In this example, the door hinge system 10 is adapted for a so-called drop-down oven door 30, which has a horizontal pivoting axis.

The door hinge system 10 comprises a stationary hinge part 12 and a pivoting hinge part 14. The stationary hinge part 12 is attached or attachable in the chassis of the cooking oven 20. The oven door is attached or attachable at the pivoting hinge part 14. The stationary hinge part 12 is elongated and extends in essence horizontally in the chassis of the cooking oven 20. The pivoting hinge part 14 is elongated and extends vertically in a closed state of the oven door 30. In an opened state of the oven door 30 the pivoting hinge part 14 extends in essence horizontally. In a partially opened state of the oven door 30 the pivoting hinge part 14 is inclined.

Further, the door hinge system 10 comprises a driving device. Said driving device includes a motor 16, a gearing 18, a gear wheel 22 and a gear wheel sector 24. The motor 16 is connected to the gearing 18 and provided for driving said gearing 18. The gear wheel 22 forms an end stage of the gearing 18. The teeth of the gear wheel 22 engage with the teeth of the gear wheel sector 24. The gear wheel sector 24 is mechanically connected to the pivoting hinge part 14. Thus, a rotation of the motor 16 effects a pivoting of the pivoting hinge part 14. An opening of the oven door 30 corresponds with a rotation of the motor in one direction, while a closing of the oven door 30 corresponds with the rotation of the motor in the opposite direction. The axis of the motor 16 extends parallel to the pivoting axis of the pivoting hinge part 14. Thus, the gearing 18 may be realised by low camplexity.

Moreover, the door hinge system 10 comprises a coupling system. For example, the coupling system is interconnected between the motor 16 and the gearing 18, wherein preferably a shaft of the motor 16 and/or the gearing 18 is moveable along its longitudinal axis. Further, the coupling system may be an internal part of the gearing 18. The coupling system is arranged either between the motor 16 and the gearing 18 or within said gearing 18.

When the motor 16 is decoupled from the pivoting hinge part 14, then the oven door 30 can be opened and closed in a conventional way, i.e. manually by the user. The user can decide if he wants to open and close the oven door 30 manually or automatically by the driving device. The motor 16 is activatable by a switch in a user interface of the cooking oven 20. The speed of the motor 16 is controlled via sensors on the shaft of the motor 16 or directly in the motor 16. When the user open or closes the oven door 30 by operating the switch or a remote control, then the motor 16 is coupled to the pivoting hinge part 14 and the oven door 30 opens or closes by the rotation of the motor 16.

If the oven door 30 is blocked by anything, e.g. someone is standing in front the oven door 30 or someone's hand is between the oven door 30 and the front frame of the cooking oven 20, then the control unit of the motor 16 detects that more voltage or power is required and stops said motor 16 immediately. After stopping the motor 16 drives back the oven door 30 in the opposite direction for a predefined distance. For example, the oven door 30 is driven back for 5 cm.

Further, the speed of the motor 16 at the end positions of the oven door 30, i.e. near the opened and closed states, may be set to lower speed values in order to obtain a soft closing of the oven door 30. The end positions of the oven door 30 are detected by sensors or switches in order to stop the rotation of the motor 16 and to decouple said motor 16 from the pivoting hinge part 14.

Preferably, when there is no power supply on the cooking oven 20, the motor 16 is always decoupled from the pivoting hinge part 14. Thus, the user is always able to open and close the oven door 30 manually.

Figure 2:
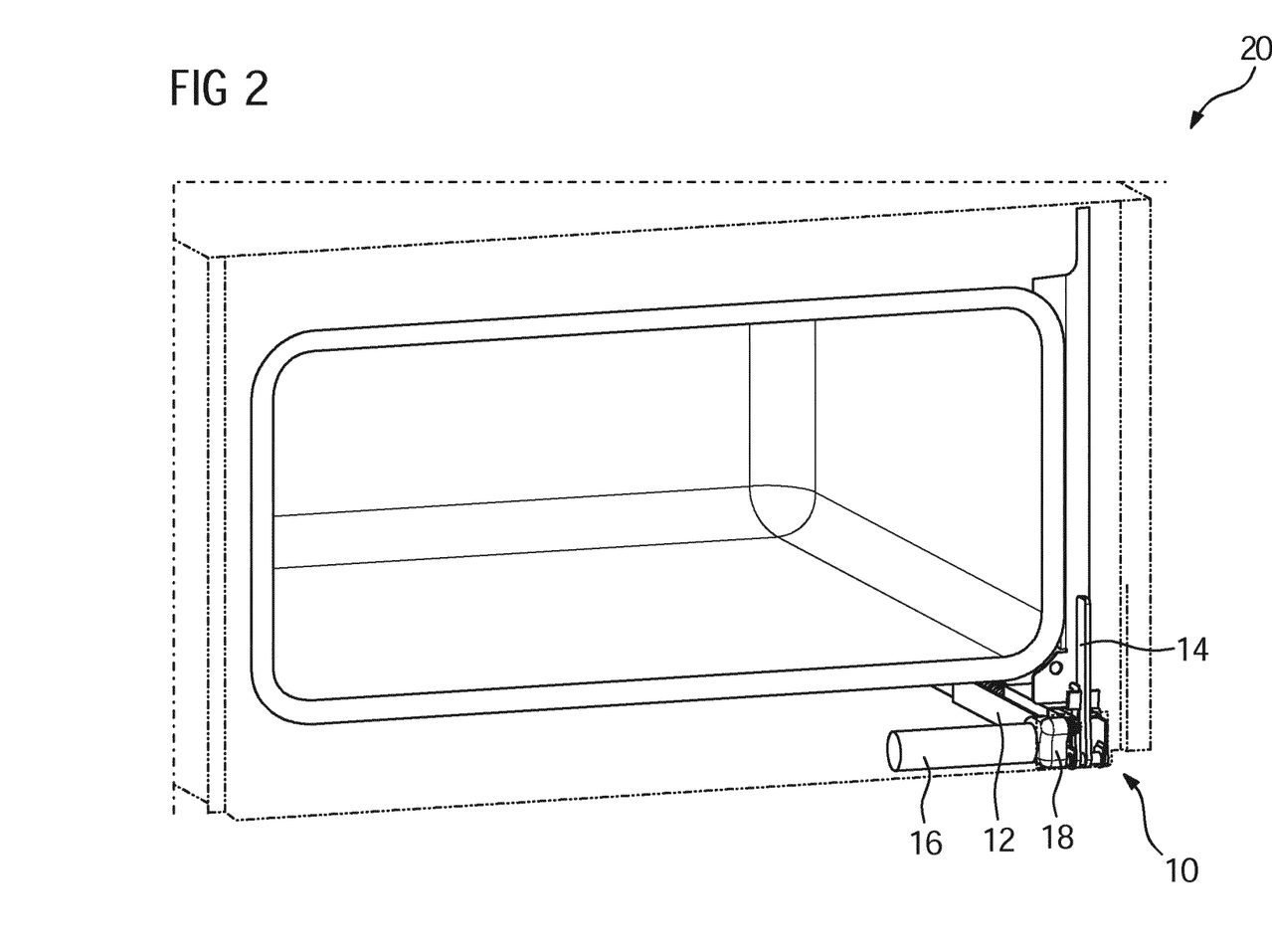
FIG. 2 illustrates a schematic perspective front view of the cooking oven with the door hinge system according to the preferred embodiment of the present invention.

FIG. 2 illustrates a schematic perspective front view of the cooking oven 20 with the door hinge system 10 according to the preferred embodiment of the present invention. FIG. 2 clarifies the arrangement of the door hinge system 10 within the cooking oven 20 and the relationship between the size of the door hinge system 10 and the size of the cooking oven 20. The driving system is arranged behind a front frame of an oven cavity and beneath a bottom of said oven cavity.

Figure 3:
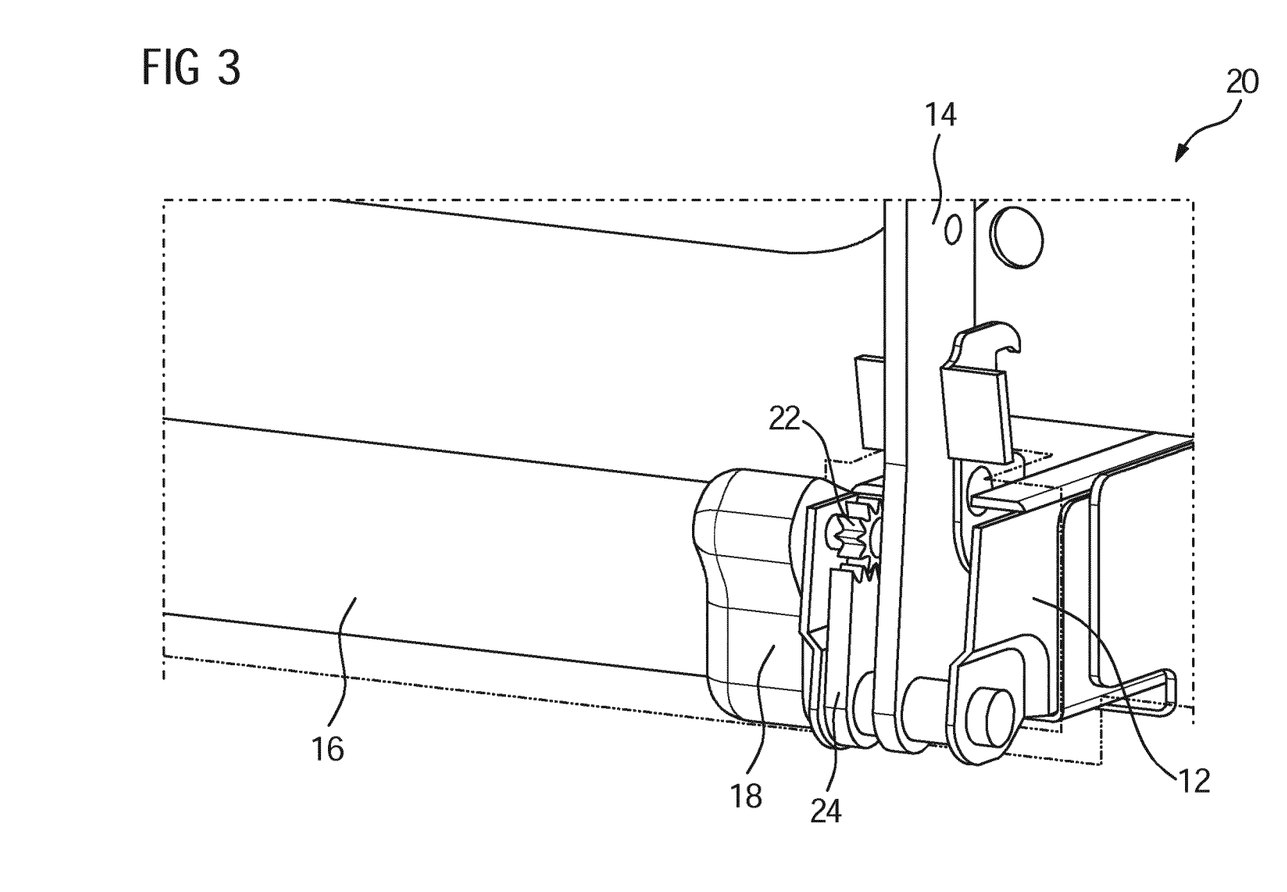
FIG. 3 illustrates a further schematic perspective front view of the door hinge system for the oven door of the cooking oven according to the preferred embodiment to the preferred embodiment of the present invention.

FIG. 3 illustrates a further schematic perspective front view of the door hinge system 10 for the oven door 30 of the cooking oven 20 according to the preferred embodiment of the present invention.

The door hinge system 10 comprises the stationary hinge part 12 and the pivoting hinge part 14. The stationary hinge part 12 is attached in the chassis of the cooking oven 20. The oven door 30 is attachable at the pivoting hinge part 14, but not shown in FIG. 3. The pivoting hinge part 14 is elongated and extends vertically in the closed state of the oven door 30.

The motor 16, the gearing 18, the gear wheel 22 and the gear wheel sector 24 form the driving device. The motor 16 is coupled to the gearing 18. The gear wheel 22 forms the end stage of the gearing 18. The teeth of the gear wheel 22 engage with the teeth of the gear wheel sector 24. The gear wheel sector 24 is mechanically connected to the pivoting hinge part 14. The rotation of the motor 16 corresponds with the pivoting of the pivoting hinge part 14.

Figure 4:
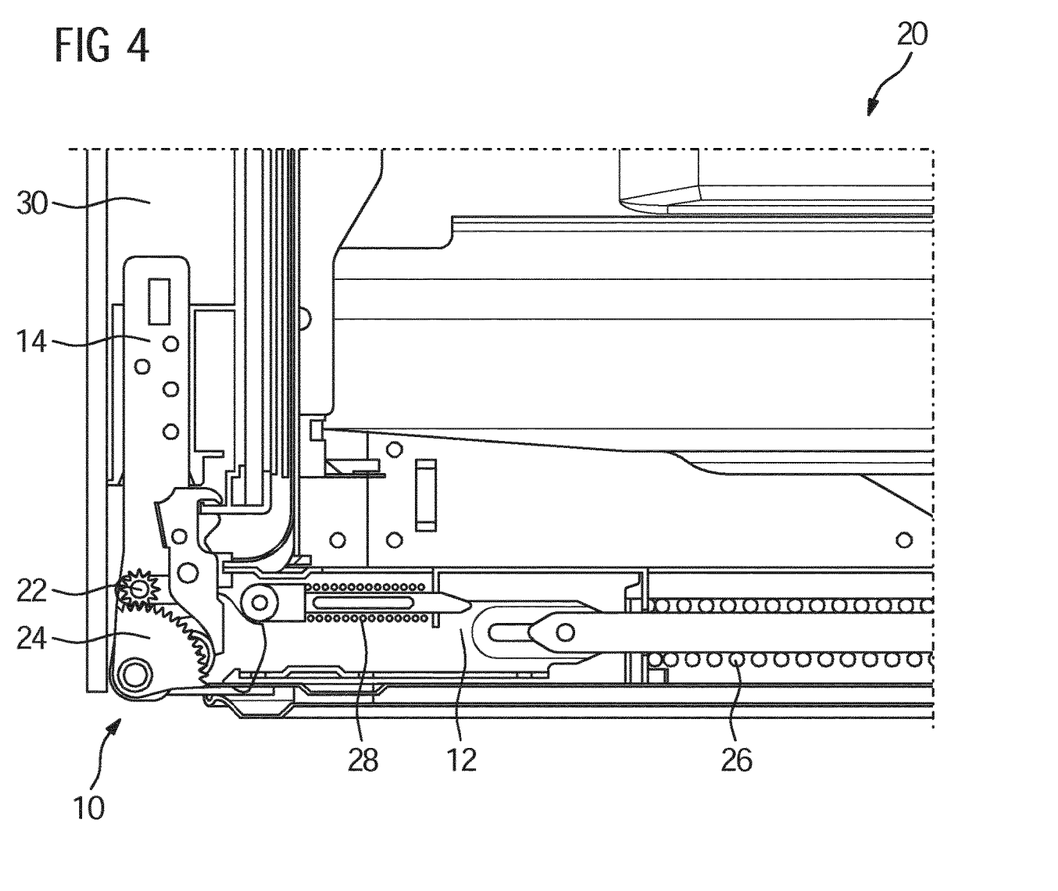
FIG. 4 illustrates a schematic sectional side view of the door hinge system for the oven door of the cooking oven according to the preferred embodiment of the present invention.

FIG. 4 illustrates a schematic sectional side view of the door hinge system 10 for the oven door 30 of the cooking oven 20 according to the preferred embodiment of the present invention.

The door hinge system 10 comprises the stationary hinge part 12 and the pivoting hinge part 14. The stationary hinge part 12 is attached in the chassis of the cooking oven 20. The oven door 30 is attached at the pivoting hinge part 14. The pivoting hinge part 14 is elongated and extends vertically in the closed state of the oven door 30. The teeth of the gear wheel 22 engage with the teeth of the gear wheel sector 24.

Further, the door hinge system 10 comprises a first spring element 26 and a second spring element 28. In this example, the first spring element 28 and the second spring element 28 are helix compression springs. In particular, the forces generated by the first spring element 26 and the second spring element 28 are provided for the manual opening and closing of the oven door 30, when the motor 16 is decoupled from the pivoting hinge part 14. Additionally, the first spring element 26 and the second spring element 28 may support the motor 16, so that the motor 16 is not loaded too excessively.

In this example, the first spring element 26 mediates a partially opened state of the oven door 30 and keeps said oven door 30 balanced within an outer opening angular range. The second spring element 28 generates a closing force for the oven door 30, so that the oven door 30 is kept in a closed state. In particular, the second spring element 28 generates a closing force for the oven door 30, so that the oven door 30 is pushed against a sealing. The oven door 30 aligned at the sealing avoids that condensate and/or steam escape from the oven cavity outward. For example, the closing force for the oven door 30 is very important in a steam cooking oven, wherein the closing force of the second spring element 28 is bigger than the pressure inside the oven cavity. Further, the bigger the closing force of the second spring element 28, the bigger is the force for opening the oven door 30.

Figure 5:
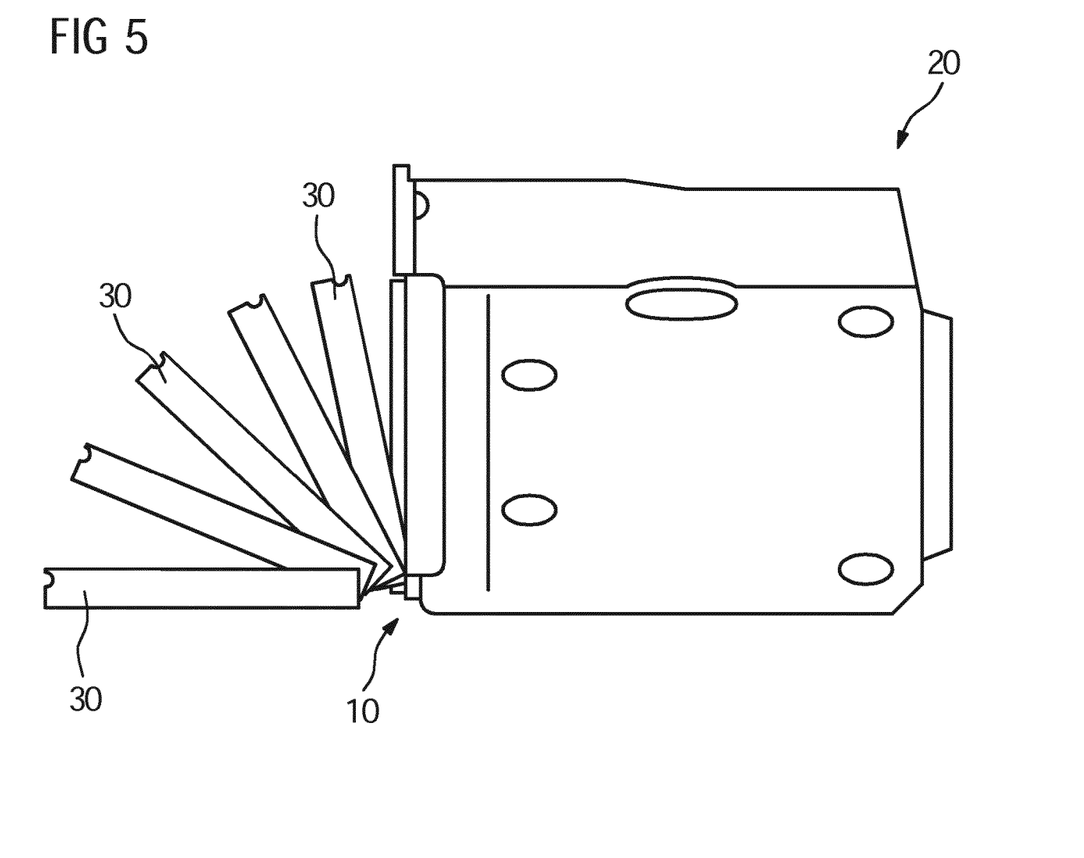
FIG. 5 illustrates a schematic perspective side view of the cooking oven with the door hinge system according to the preferred embodiment of the present invention.

FIG. 5 illustrates a schematic perspective side view of the cooking oven 20 with the door hinge system 10 according to the preferred embodiment of the present invention. FIG. 5 shows different states of the oven door 30.

The door hinge system 10 according to the present invention allows an intelligent oven door 30. Said intelligent oven door 30 may be activated by a switch, a remote control, application software (APP) and/or voice control. The intelligent oven door 30 may be automatically opened, when the user goes to place food stuff in to the oven cavity of the cooking oven 20. For example, this may be controlled by a proximity sensor, which is activated while the cooking oven 20 is working. At the end of the cooking process the oven door 20 may be automatically opened, so that a steam cloud and residual heat can dissipate. For example, the user can decide if the oven door 20 is automatically opened. Said residual heat would overcook the food stuff, if the oven door 30 would remain in the closed state, even if the cooking oven 20 is deactivated. If the user is absent and the food stuff would cool down, e.g. below 100° C., then a function is automatically activated for keeping said food stuff warm, wherein the oven door 30 is closed again. The intelligent oven door 30 prevents an overcooking of the food stuff.

At the end of the cooking process the cooking oven 20 is warm and a cooling fan is running in order to cool down said cooking oven 20. In this case the intelligent oven door 30 is automatically slightly opened in order to speed up the cooling down of the cooking oven 20. These operations dry the cooking oven 20 and reduce the condensation therein. Said condensation may cause odour or in the worst case a basis for bacteria.

The intelligent oven door 30 is programmable for a plurality of activities. The user is able to manage remotely the opening and closing of the oven door 30 by the application software on a smart device. The speed for opening and closing the oven door 30 may be adjusted by the user. At the end of the cooking process the intelligent oven door 30 is opened and closed in such a way that the condensation therein is minimised.

Although an illustrative embodiment of the present invention has been described herein with reference to the accompanying drawings, it is to be understood that the present invention is not limited to that precise embodiment, and that various other changes and modifications may be affected therein by one skilled in the art without departing from the scope or spirit of the invention. All such changes and modifications are intended to be included within the scope of the invention as defined by the appended claims.

LIST OF REFERENCE NUMERALS

10 door hinge system
12 stationary hinge part
14 pivoting hinge part
16 motor
18 gearing
20 domestic appliance, cooking oven
22 gear wheel
24 gear wheel sector
26 first spring element
28 second spring element
30 oven door

The invention claimed is:

1. A domestic appliance comprising:
a chassis,
a door that is pivotable from a fully closed position, through a range of partially opened positions, to a fully opened position,
a stationary hinge part arranged in the chassis,
a pivoting hinge part connected to the door and pivotably connected to the stationary hinge part,
a driving device for driving the pivoting hinge part, the driving device having a motor reversibly coupled to the pivoting hinge part and gearing interconnected between the motor and pivoting hinge part, the driving device being automatically controllable,
wherein the pivoting hinge part is manually pivotable when the motor is decoupled from the pivoting hinge part, and
wherein the motor is configured to stop when pivoting of the pivoting hinge part is blocked, and then to pivot back the pivoting hinge part in an opposite direction a predefined distance or to a predefined angle.

2. The domestic appliance according to claim 1, wherein the gearing includes a gear wheel forming an end stage of said gearing.

3. The domestic appliance according to claim 2, wherein the driving device includes a gear wheel sector connected or connectable to the pivoting hinge part, wherein teeth of said gear wheel sector engage with teeth of the gear wheel of the gearing.

4. The domestic appliance according to claim 3, further comprising a coupling system interconnected between the motor and the gearing, the coupling system being formed between the gear wheel and the gear wheel sector and/or the coupling system being formed between the gear wheel sector and the pivoting hinge part.

5. The domestic appliance according to claim 1, wherein a rotation axis of the motor extends parallel to a pivoting axis of the pivoting hinge part.

6. The domestic appliance according to claim 1, wherein the blocking of pivoting of the pivoting hinge part is detected or detectable when more voltage or power for the motor is required.

7. The domestic appliance according to claim 1, wherein the blocking of pivoting of the pivoting hinge part is detected or detectable by a sensor.

8. The domestic appliance according to claim 1, wherein the driving device is controlled or controllable by a remote control.

9. The domestic appliance according to claim 1, further comprising a spring element for generating a force acting onto the pivoting hinge part, wherein said force supports a manual opening and closing of the door.

10. The domestic appliance according to claim 1, further comprising a first spring element mediating a partially opened state of the door and keeping said door balanced within an outer opening angular range, wherein the outer opening angular range extends between the partially opened state and a completely opened state of the door.

11. The domestic appliance according to claim 10, further comprising a second spring element generating a closing force for the door so that the door is kept closed.

12. The domestic appliance according to claim 11, wherein the second spring element said closing force being effective so that the door is pushed or pushable against a sealing.

13. The domestic appliance according to claim 1, wherein:
the gearing comprises an end-stage gear wheel having a first set of gear teeth, and a gear wheel sector mechanically connected to said pivoting hinge part and having a second set of gear teeth engaged with the first set of gear teeth of said end-stage gear wheel; and
the domestic appliance further comprises a coupling system adapted to reversibly couple a drive shaft of said motor with said gearing such that when coupled operation of said motor is effective to open or close said door by causing corresponding rotation of said pivoting hinge part about the pivot axis thereof, and such that when uncoupled operation of said motor is ineffective to open or close said door and said door is thus adapted to be opened or closed manually by a user; and a user-selectable switch for opening or closing said door, said appliance being adapted such that upon actuation of said switch said coupling system couples the motor drive shaft to the gearing for motor-driven opening or closing of said door in response thereto.

14. The domestic appliance according to claim 13, said appliance being adapted to detect the presence of an object blocking an opening or closing path of said oven door while being opened or closed by said motor based on an increased voltage demand of said motor during said opening or closing thereof, and to immediately cease said opening or closing upon detecting said increased voltage, and thereafter to operate the motor in the opposite direction in order to pivot the door the predefined distance in a direction opposite to that wherein said blocking object was encountered.

15. The domestic appliance according to claim 13, further comprising a door-position sensor adapted to detect that said door is approaching or in said fully closed position, said domestic appliance being further adapted to slow a speed of said motor upon detecting said door approaching said fully closed position in order to realize a soft closing of said door.

16. The domestic appliance according to claim 1, further comprising an oven cavity.

17. The domestic appliance according to claim 1, wherein the gearing comprises an end-stage gear wheel having a first set of gear teeth, and a gear wheel sector mechanically connected to said pivoting hinge part and having a second set of gear teeth engaged with the first set of gear teeth of said end-stage gear wheel.

* * * * *